(12) United States Patent
Ishidoshiro

(10) Patent No.: US 7,401,229 B2
(45) Date of Patent: Jul. 15, 2008

(54) REMOTE ACCESS SYSTEM, REMOTE ACCESS METHOD, AND MEDIUM CONTAINING REMOTE ACCESS PROGRAM

(75) Inventor: Takashi Ishidoshiro, Nagoya (JP)

(73) Assignee: Melco Holdings Inc.

( * ) Notice: Subject to any disclaimer, the term of this patent is extended or adjusted under 35 U.S.C. 154(b) by 584 days.

(21) Appl. No.: 10/927,573

(22) Filed: Aug. 26, 2004

(65) Prior Publication Data

US 2005/0086493 A1 Apr. 21, 2005

(30) Foreign Application Priority Data

Sep. 10, 2003 (JP) ............... 2003-318925

(51) Int. Cl.
*H04L 9/32* (2006.01)
*H04L 9/00* (2006.01)
(52) U.S. Cl. ..................... 713/189; 192/193
(58) Field of Classification Search ................ 713/189, 713/185, 192–194; 726/2–4, 9
See application file for complete search history.

(56) References Cited

U.S. PATENT DOCUMENTS

| | | | |
|---|---|---|---|
| 5,995,965 A | 11/1999 | Experton | |
| 6,085,976 A | 7/2000 | Sehr | |
| 6,175,789 B1 * | 1/2001 | Beckert et al. | 701/33 |
| 6,460,138 B1 * | 10/2002 | Morris | 713/184 |
| 2002/0046342 A1 | 4/2002 | Elteto et al. | |
| 2002/0069364 A1 | 6/2002 | Dosch | |

FOREIGN PATENT DOCUMENTS

KR 2002-0053045 7/2002

OTHER PUBLICATIONS

Communication dated Jan. 3, 2005 including European Search Report dated Dec. 22, 2004 (total 3 pages).
Korean Office Action dated Jun. 9, 2006.

* cited by examiner

*Primary Examiner*—Hosuk Song
(74) *Attorney, Agent, or Firm*—Peter Ganjain

(57) ABSTRACT

To protect a password from leakage, it is necessary to change it frequently, which is troublesome and difficult to be done realistically. According to the present invention, an encrypted access code is stored in a transportable and nonvolatile memory on the part of a computer to be remotely accessed. When a user actually carries the nonvolatile memory to plug it into a computer remotely accessing, remote access is established between the computer to be remotely accessed and the computer remotely accessing.

12 Claims, 9 Drawing Sheets

REMOTE ACCESS SYSTEM, REMOTE ACCESS METHOD, AND MEDIUM CONTAINING REMOTE ACCESS PROGRAM

BACKGROUND OF THE INVENTION

1. Field of the Invention

The present invention relates to a remote access system in a network using radio transmission, a remote access method, and a medium containing a remote access program 2. Description of the Related Art In recent years, computers at remote sites have been accessed over networks. Because a computer is connected to a network, it is necessary to discourage unauthorized persons from accessing the computer. Conventionally, an access code (a password) is registered in advance with a remote computer. When the access code is inputted through a computer to be operated, the access code is sent to the remote computer, which determines whether or not to allow the access.

The disadvantage of a password is that it can leak out. A password as information that a person can memorize may leak out. Once it leaks out, unauthorized access can easily be made.

In order to prevent the risk of leakage, it is necessary to change the password frequently. However, it is troublesome and difficult to be done realistically.

SUMMARY OF THE INVENTION

The present invention relates to a remote access system comprising a pair of computers in which one computer is connected with another computer through a network organized by way of radio transmission, and its primary feature is as follows:

An access code for allowing remote access is registered with the above one computer. Also, a transportable and removable nonvolatile memory can be plugged into the above computer, which encrypts the above access code by a prescribed method and stores it in the nonvolatile memory. The other computer can accommodate the above nonvolatile memory. Further, when the nonvolatile memory is plugged into it, the computer can decrypt the encrypted access code and makes it possible to access the above one computer by using the decrypted access code.

A user achieves remote access by using a pair of computers connected by way of radio transmission. On this occasion, an access code is registered with one computer. The access code may be the one peculiar to the computer, or the user may set it himself or herself. A nonvolatile memory is plugged into the computer, and the above access code is encrypted by a method of some kind and stored. At this point, the nonvolatile memory becomes a physical key. The user takes this physical key to the other computer and plugs it into the computer. Then, the user decrypts the access code encrypted and stored in the nonvolatile memory and gains access to the other computer through a network by using the access code.

Thus, on the side accessed from a remote site, the access code registered with the computer is encrypted and stored in the physical nonvolatile memory. When accessing from the remote site, a holder of the nonvolatile memory plugs it into the computer and decrypts the access code. Therefore, the access code is prevented from leaking out and the remote access system which improves security by a simple method can be achieved.

According to one of the embodiments of the invention, the above nonvolatile memory may be a SmartMedia card. Also, it may be a USB memory.

As an example where such remote access is applied, it may be the case in which the above one computer is installed in a motor vehicle. If a computer is installed in the motor vehicle, it becomes possible to remotely access the computer in the motor vehicle, in a garage of each home, from a desktop computer at home within a range of a wireless LAN of a home network. By connecting the computer with an engine system, a security system, and a navigation system of the motor vehicle, usefulness in many ways can be enhanced.

Each motor vehicle has its own vehicle identification number. Therefore, as in the invention according to claim 5, the vehicle identification number may be included in the access code. Thus, diversity and uniqueness of the access code are enhanced, contributing to the improvement of security and, when the motor vehicle is stolen, to the discovery of the vehicle by using the vehicle identification number. As one aspect where a vehicle identification number is included in the access code, being based on the vehicle identification number itself, a password designated by a user may be added. Also, as far as the discovery of the vehicle in the case of theft is concerned, it may be such a system that a response is obtained by using the vehicle identification number only in specific circumstances.

Further, as an example of the case of the other computer, according to one of the embodiments of the invention, the access code of the other computer may be based on an individual identification number of its CPU. In this case also, while being based on the individual identification number only, an access code with a user's password added may be generated. In the case of the other computer installed at home, according to one of the embodiments of the invention, the other computer may be a home server storing music data. In this regard, if one computer is installed in a motor vehicle, it becomes possible for a user to have the computer in the vehicle download the user's music files and to reproduce them on a car audio system when the user drives the car next time.

It serves the purpose if radio transmission is at least partially involved in the network. According to one of the embodiments of the invention, the pair of computers described above may be connected with each other in a home network system. Alternatively, according to one of the embodiments of the invention, the pair of computers may be connected with each other through the Internet.

It is difficult to change the password frequently in that we depend on our memory. However, according to one of the embodiments of the invention, when the nonvolatile memory described above is removed, the above access code may be generated at random and stored in the other computer as well as in the nonvolatile memory. Namely, the nonvolatile memory is loaded when the above one computer is being used by a user himself or herself and, if the nonvolatile memory is removed after the operation, a new access code is generated at random. When the user leaves the one computer and moves to a site where the other computer is located, the nonvolatile memory is plugged into the other computer. Since the access code is generated during the most recent operation, the risk of remote access being made by an outsider in the mean time can be minimized. In particular, when the user leaves one place for another, the access code is generated at the end of the operation of the computer to be remotely accessed, and the computer is located at a site where it is actually inoperable, which would be convenient.

Since the access code is a piece of information, unauthorized access can be made if it leaks out. Encryption is used to prevent it and to cope with a case where a nonvolatile memory is stolen. However, as an example to further improve security, according to one of the embodiments of the invention, first key data, which are like a pair of a public key and a secret key, are each stored in the above pair of computers. The data encrypted by using one key data cannot be decrypted without using the other key data. Accordingly, on the part of the one computer, the above access code is encrypted by the one key data and stored in the nonvolatile memory. This way, even if the nonvolatile memory is obtained in an unauthorized manner, it is almost impossible to decrypt the access code in it. Further, even when the nonvolatile memory is left behind, it is often the case that the nonvolatile memory and the pair of computers are in different locations, and decryption of the access code is meaningless.

In order to access remotely, the nonvolatile memory is plugged into the other computer. Then, the access code can easily be decrypted by using the other key data stored in the computer, and the remote access becomes available by using it.

Further, the system may be configured such that, when leaving the computer, the key data is used to password-lock the computer so as to respond only to the remote access and, accordingly, the lock cannot be released without the nonvolatile memory, which can improve security.

Even if the nonvolatile memory is not stolen, the access code in it may leak while being transmitted over a network. According to one of the embodiments of the invention, when the other computer remotely accesses the one computer, it uses the above other key data to encrypt the access code and transmits it. The above one computer decrypts the encrypted access code by using the above one key data, compares the pre-stored access code with the access code transmitted and authenticates it. Therefore, even when information is obtained on a network, an unauthorized use of it is impossible without the pair of key data.

Of course, it is obvious that the invention is also realized in individual computers making up such a remote access system.

According to the above method, as the user moves, the access code is stored in the transportable and physical nonvolatile memory and remote access is made from a new location of the user to the computer that the user left. Application of this method is not limited to a substantial apparatus, and it is easily understood that it functions as a method itself. Thus, a remote access method in a network system in which a pair of computers each capable of accommodating a transportable and removable nonvolatile memory are connected at least by way of radio transmission is available. An access code for allowing remote access is registered with one computer, and the access code is encrypted in a prescribed manner and stored in the nonvolatile memory. The other computer decrypts the above encrypted access code when the nonvolatile memory is plugged into it and becomes capable of accessing the above one computer by using the decrypted access code. Namely, application of this method is not limited to a substantial apparatus, and the invention is effective as a method itself.

Incidentally, such a remote access system may exist alone or it may be incorporated into a certain apparatus, and the spirit of the invention includes various kinds of aspects. Therefore, it may be software or hardware according to the need.

As an embodiment of the spirit of the invention, when the remote access system is software, it naturally exists in a storage medium containing such software and is utilized.

As an example, a medium which contains a remote access program for a network system wherein a pair of computers each capable of accommodating a transportable and removable nonvolatile memory are connected at least by way of radio transmission is available. An access code for allowing remote access is registered with one computer, and a function of encrypting the access code by a prescribed method and storing it in the nonvolatile memory is achieved. At the other computer, a function of decrypting the encrypted access code when the nonvolatile memory is plugged into it and accessing the above one computer by using the decrypted access code is achieved.

Of course, the storage medium may be a magnetic storage medium or a magneto optical storage medium, or it may be any storage medium to be developed in the future. Further, stages of reproduction such as a first reproduction and a second reproduction are doubtlessly equivalent. Further, the present invention is also doubtlessly utilized even when a communication line is used as a supplying means.

Further, the spirit of the invention is still the same even if it is partly software and partly hardware, or it may be in a form where a part of it is stored in a storage medium and is read out as the need arises.

When achieving the present invention in the form of software, it is possible to utilize hardware or an operating system. Alternatively, it can be achieved separately from them. In the case of computing, for example, it can be achieved by calling up a prescribed function in the operating system and carrying out processing. Alternatively, data entry can be made by using hardware without calling up such a function. Even if it is achieved actually through the operating system, it is understood that the present invention can be realized by this program alone in a process where the program is stored on the medium and transferred.

Further, when achieving the present invention with software, it is a matter of course that not only the invention is embodied as a medium containing a program but also the invention is embodied as a program itself, and the program itself is included in the present invention.

According to the present invention, on the part of the computer accessed from a remote site, the access code registered with the computer is encrypted and stored in a physical nonvolatile memory. When accessing from the remote site, a holder of the nonvolatile memory plugs it into the computer and decrypts the access code. Accordingly, the access code does not easily leak, achieving a remote access system in which security is improved with a simple method.

DESCRIPTION OF THE PREFERRED EMBODIMENTS

Figure 1:
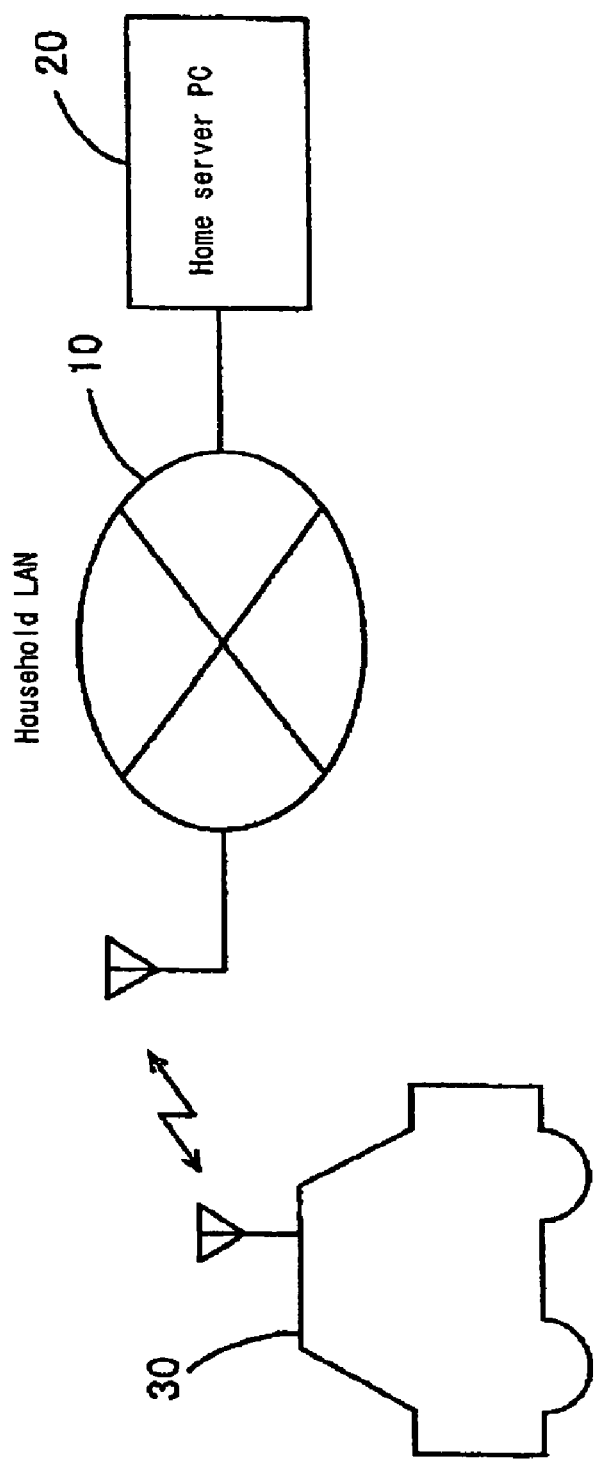
FIG. 1 is a schematic diagram of a network system to which the present invention is applied (Embodiment 1)

Referring to the drawings, embodiments of the present invention will now be described.

[Embodiment 1]

FIG. 1 is a schematic diagram of a network system to which the present invention is applied.

In FIG. 1, a local area network (hereafter called LAN) 10 is compatible with both the wire system and wireless system. A desktop computer (hereafter called home server PC) 20 has a function of a home server and is connected to the LAN 10 through the wire system. A vehicle-mounted computer 30 is installed in a motor vehicle and is connected to the LAN 10 by the wireless system.

Figure 2:
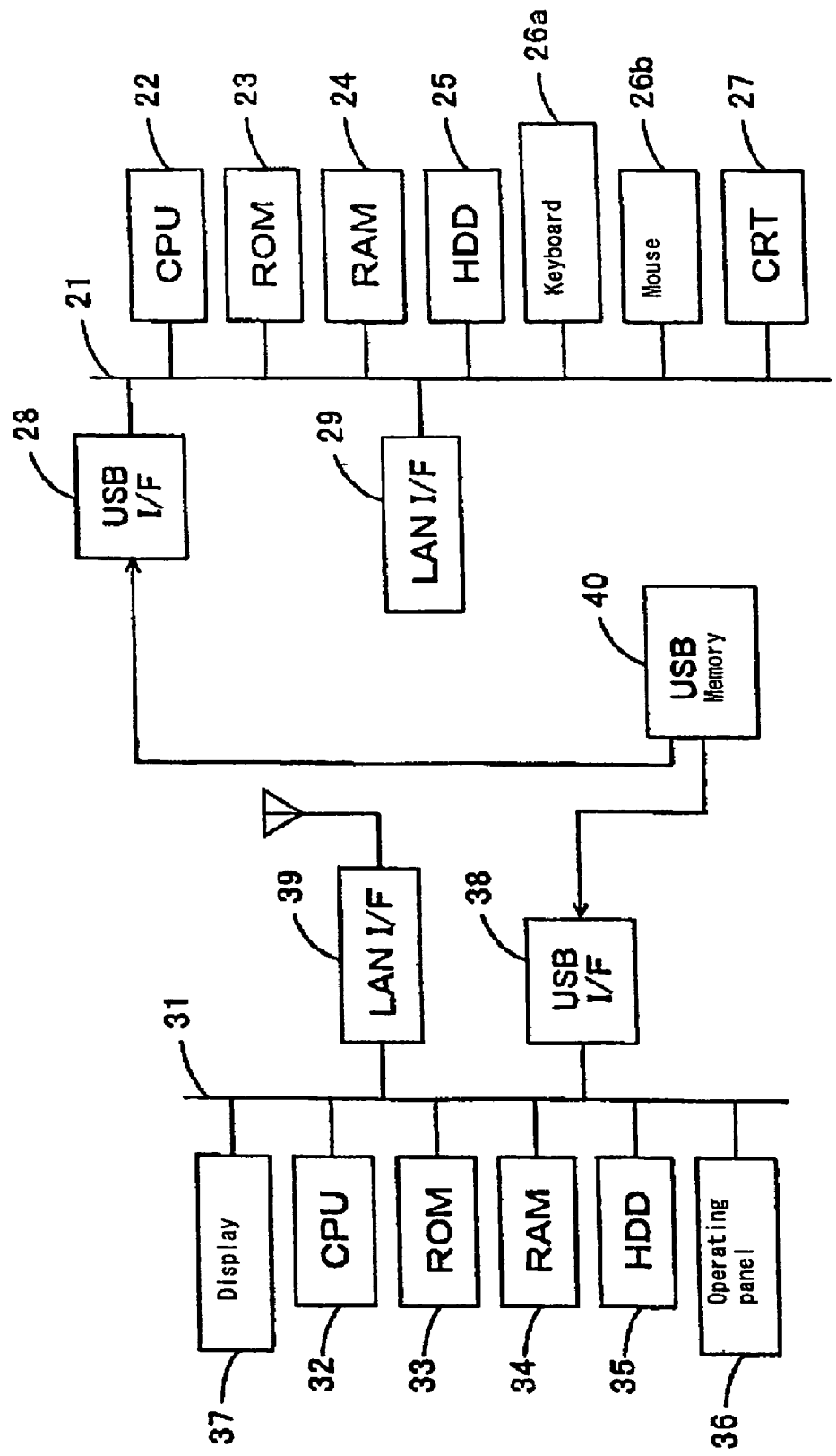
FIG. 2 is a block diagram showing a configuration of each computer in the network system.

FIG. 2 is a detailed block diagram of the network system. Connected to the home server PC 20 are a CPU 22, ROM 23, RAM 24, and the like through a bus 21. Also, a hard disk 25 storing programs and data, as well as a keyboard 26a, a mouse 26b, and a CRT 27 through a prescribed interface is connected to the home server PC 20.

Further, the home server PC 20 has a USB interface 28 with which various USB-compliant devices can be connected. As one of the USB-compliant devices, a USB memory 40 to be described later can be connected to the home server PC 20, which is capable of writing and reading data to and from the USB memory 40 by executing a prescribed program.

Further, the home server PC 20 has a wired LAN interface 29, and is connected to the LAN 10 through the wired LAN interface 29.

The vehicle-mounted computer 30 also has a configuration basically similar to the home server PC 20. A CPU 32, ROM 33, RAM 34, and the like are connected to the computer 30 through a bus 31. Also, a hard disk 35 storing a program and data, as well as an operating panel 36, a display 37, etc. through a prescribed interface. Further, the vehicle-mounted computer 30 has a USB interface 38 through which the USB memory 40 is connected so that data are written and read to and from it, and also has a wireless LAN interface 39 for connection to the LAN 10.

Figure 3:
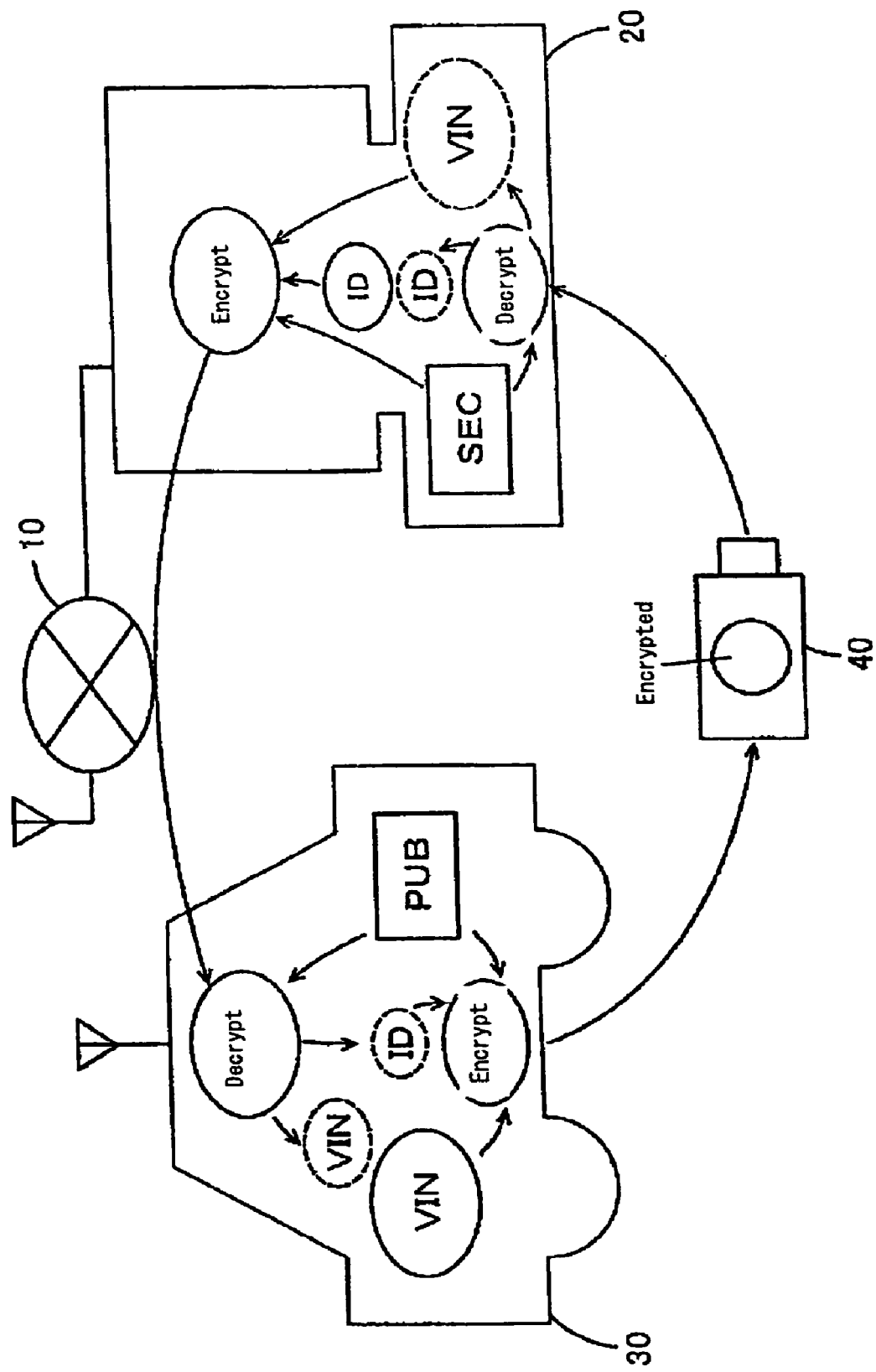
FIG. 3 is a schematic diagram showing encryption and decryption of an access code in a remote access system.

FIG. 3 shows a process in outline of encryption and decryption of the access code. FIGS. 4 through 7 show flowcharts for achieving remote access by using the encryption and decryption.

As a prerequisite to it, an uncorrectable unique ID is stored in the home server PC 20 and an uncorrectable vehicle identification number VIN is stored in the vehicle-mounted computer 30. Also, what we call a public key PUB and a secret key SEC are stored. The public key PUB and the secret key SEC are key data which are used in a pair. Namely, data encrypted by one of the key data cannot be decrypted unless the other of the key data is used. The vehicle identification number VIN, which is an access code of the vehicle-mounted computer 30 is encrypted by using the public key PUB, stored in the USB memory 40, and decrypted on the part of the home server PC 20 by using the secret key SEC. The decrypted vehicle identification number VIN is encrypted by the secret key SEC and is sent to the vehicle-mounted computer 30 over the LAN 10. The vehicle identification number VIN of the vehicle-mounted computer 30 is decrypted by using the public key PUB and is used for authentication. Also, the unique ID is subjected to the same processing. In either case, every time the encryption is conducted the different data is added so that the data itself after the encryption may change.

Figure 4:
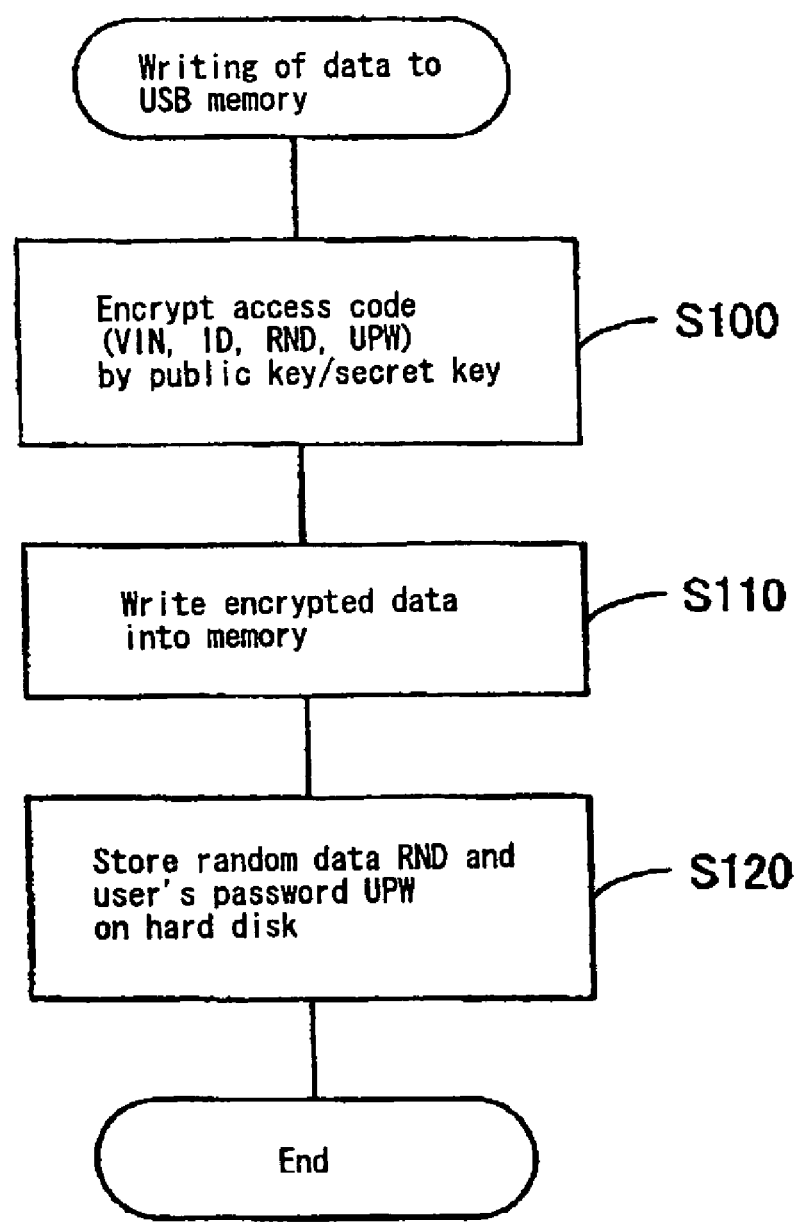
FIG. 4 is a flowchart showing a process performed by each computer.
Figure 5:
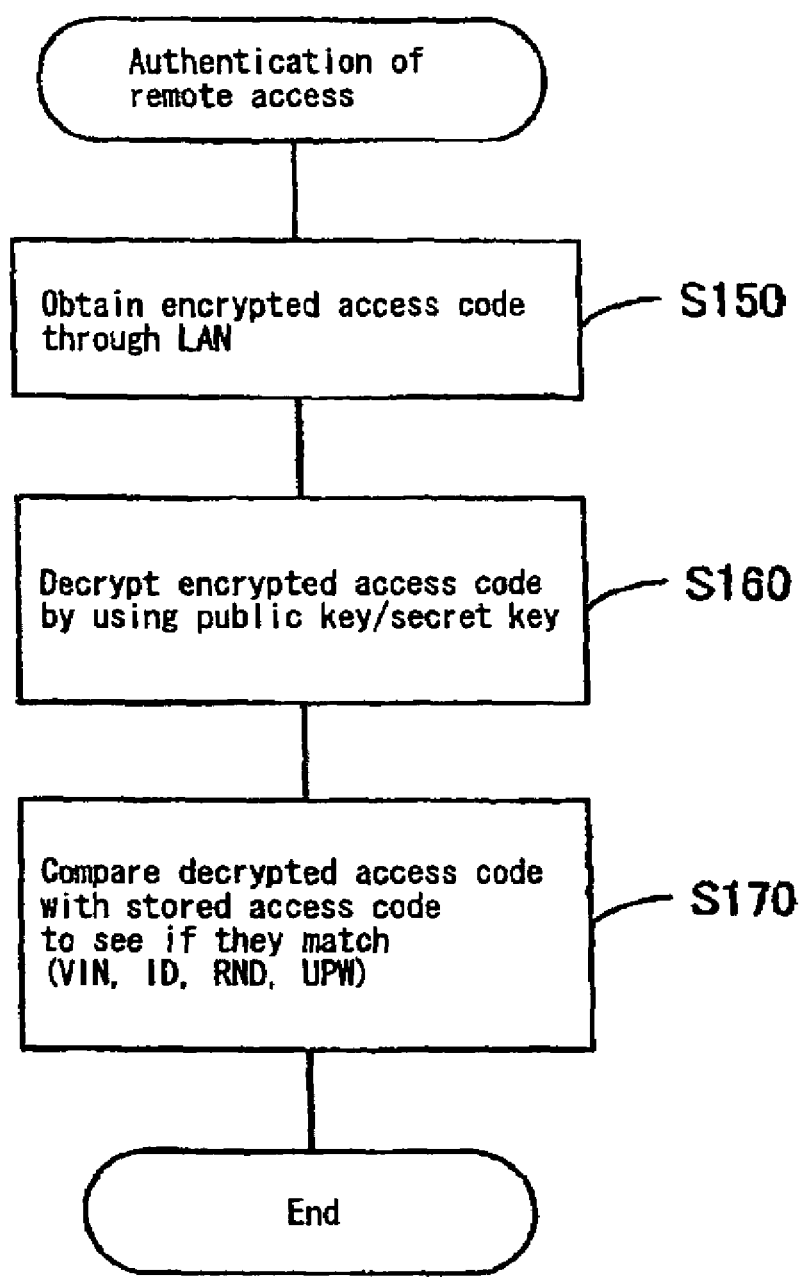
FIG. 5 is a flowchart showing a process performed by each computer.

FIGS. 4 and 5 show flowcharts of programs executed by the CPU 32 of the vehicle-mounted computer 30 to be remotely accessed and the CPU 22 of the home server PC 20. The programs are recorded on hard disks 35 and 25.

An example for achieving remote access from the home server PC 20 to the vehicle-mounted computer 30 will be described below.

At the vehicle-mounted computer 30, when the USB memory 40 is attached to the USB interface 38, the access code is stored in the USB memory 40 as shown in the flowchart of FIG. 4. As a prerequisite to it, a name and so on to be a flag as a medium storing the access code is given to the USB memory 40 by a utility program (not shown), etc.

In step S100, the access code is encrypted by the public key PUB/secret key SEC, and the encrypted data is written into the USB memory 40 in step S110. For the access code, any one of the vehicle identification number VIN, the unique ID, random data RND produced by the random numbers every time the program is started, and the user's password UPW set by the user in advance, or a combination thereof may be used. Further, whether to use the public key PUB or the secret key SEC depends on which of the vehicle-mounted computer 30 and the home server PC 20 is used. The vehicle-mounted computer 30 uses the public key PUB and the home server PC 20 uses the secret key SEC. On the program, the key data stored in an area of each computer may be used, and there is no need to differentiate between the public key PUB and the secret key SEC.

The vehicle identification number VIN is useful for finding the stolen vehicle in that every vehicle-mounted computer 30 has a different number without exception. As for the random data RND, every time the USB memory 40 is plugged in, discrete data is always created. Therefore, it has an advantage in that less devices have leakage of data and in that the same data is not used over a long period. The user's password UPW has an advantage in accomplishing security in that it can further be set for every user even when generating algorithm of the random data or when the vehicle identification number VIN leaks out. Depending on the case, it is also useful as a user code for specifying each of the plurality of vehicle-mounted computers 30 owned by the user. In the case of the home server PC 20, an ID and so on stored in its CPU are used instead of the vehicle identification number VIN.

When using random data RND or the user's password UPW, in step S120, it is stored on the hard disk 35 which is a nonvolatile storage area. Further, it is preferable to encrypt the hard disk 35 itself by a conventional encryption technology.

After storing the access code in the USB memory 40 like this, the vehicle-mounted computer 30 authenticates a request for remote access inputted through the LAN 10. FIG. 5 is a flowchart of the authentication of the remote access.

In step S150, an encrypted access code is obtained through the LAN 10.

In step S160, by using the public key PUB/secret key SEC stored in the vehicle-mounted computer 30, the encrypted access code is decrypted. In step S170, it is determined whether or not the decrypted access code matches the stored access code. If it does, the remote access is successfully authenticated and the access thereafter is allowed. In this case, also, it serves the purpose if the vehicle-mounted computer 30 uses the public key PUB and the home server PC 20 uses the secret key SEC and, on the program, each computer uses key data stored in an area of itself. Therefore, there is no need to differentiate between the public key PUB and the secret key SEC.

Above example is the case when achieving remote access from the home server PC 20 to the vehicle-mounted computer 30. On the contrary, if it is the case when achieving remote access from the vehicle-mounted computer 30 to the home server PC 20, the home server PC 20 performs the above processing to encrypt the access code and store it in the USB memory 40, or to conduct authorization on the basis of the inputted access code through the LAN 10.

Figure 6:
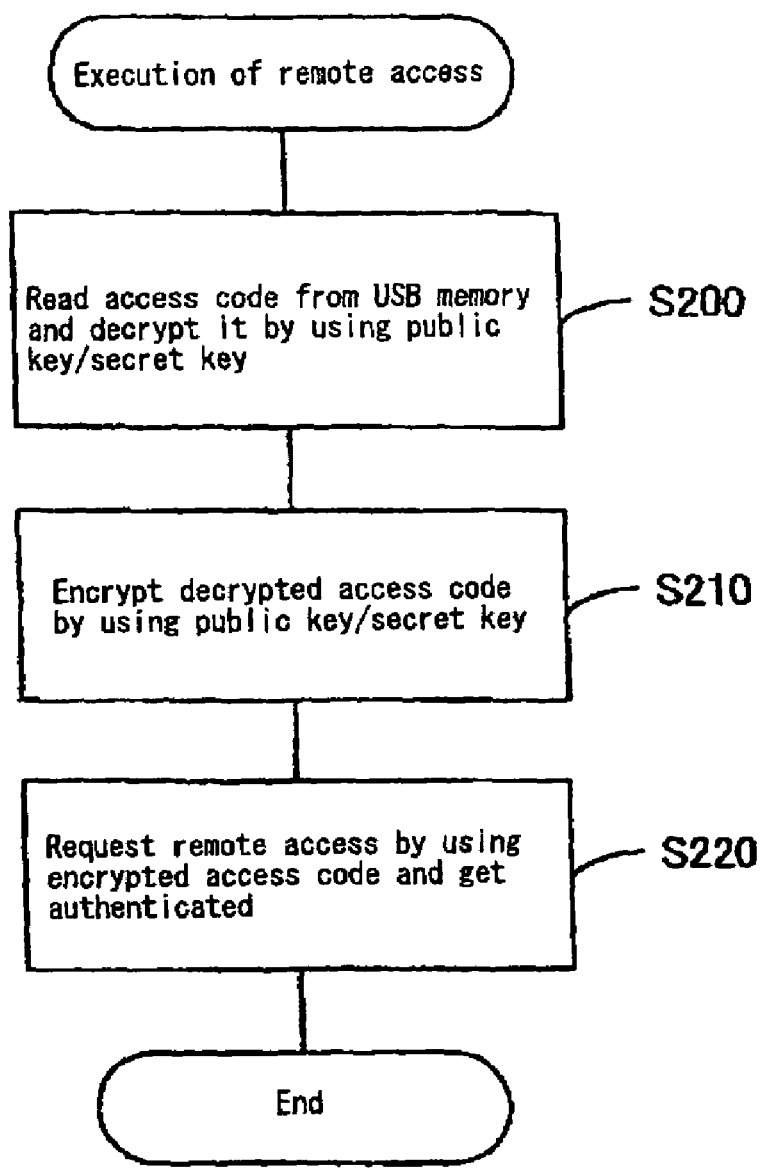
FIG. 6 is a flowchart showing a process performed by each computer.
Figure 7:
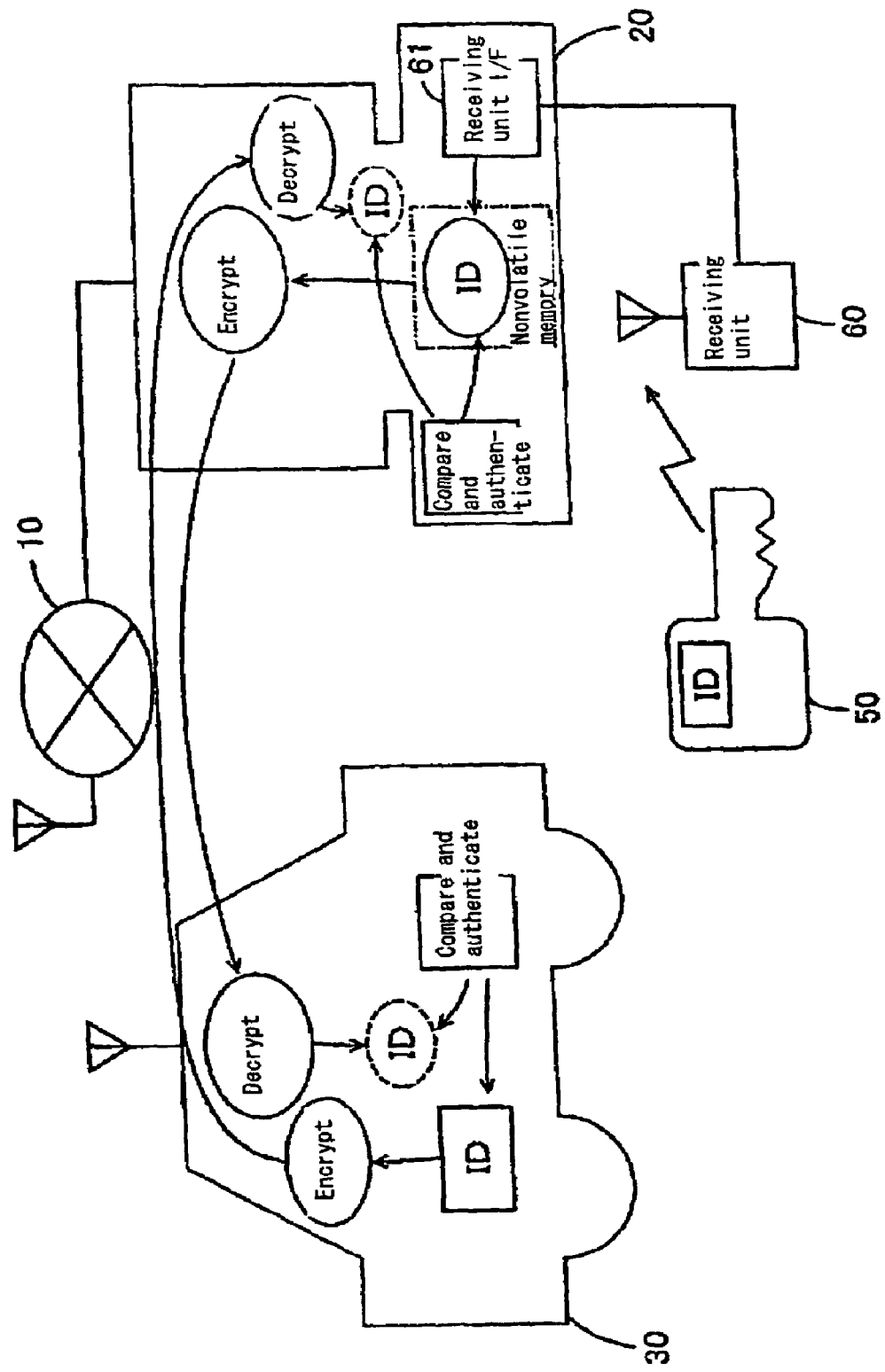
FIG. 7 is a schematic diagram showing an authentication method in a remote access system of another embodiment.
Figure 8:
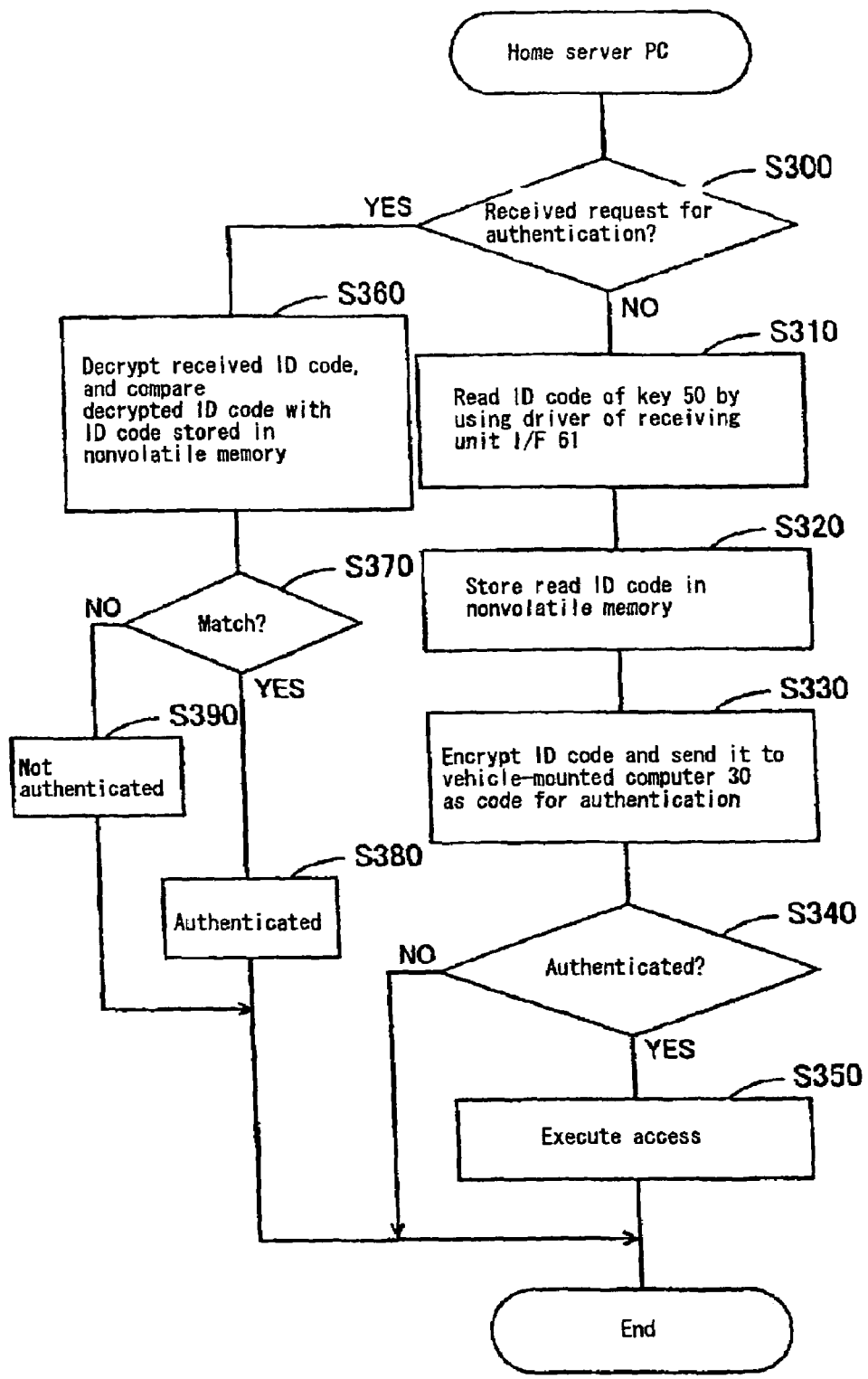
FIG. 8 is a flowchart showing a process performed by a home server PC.
Figure 9:
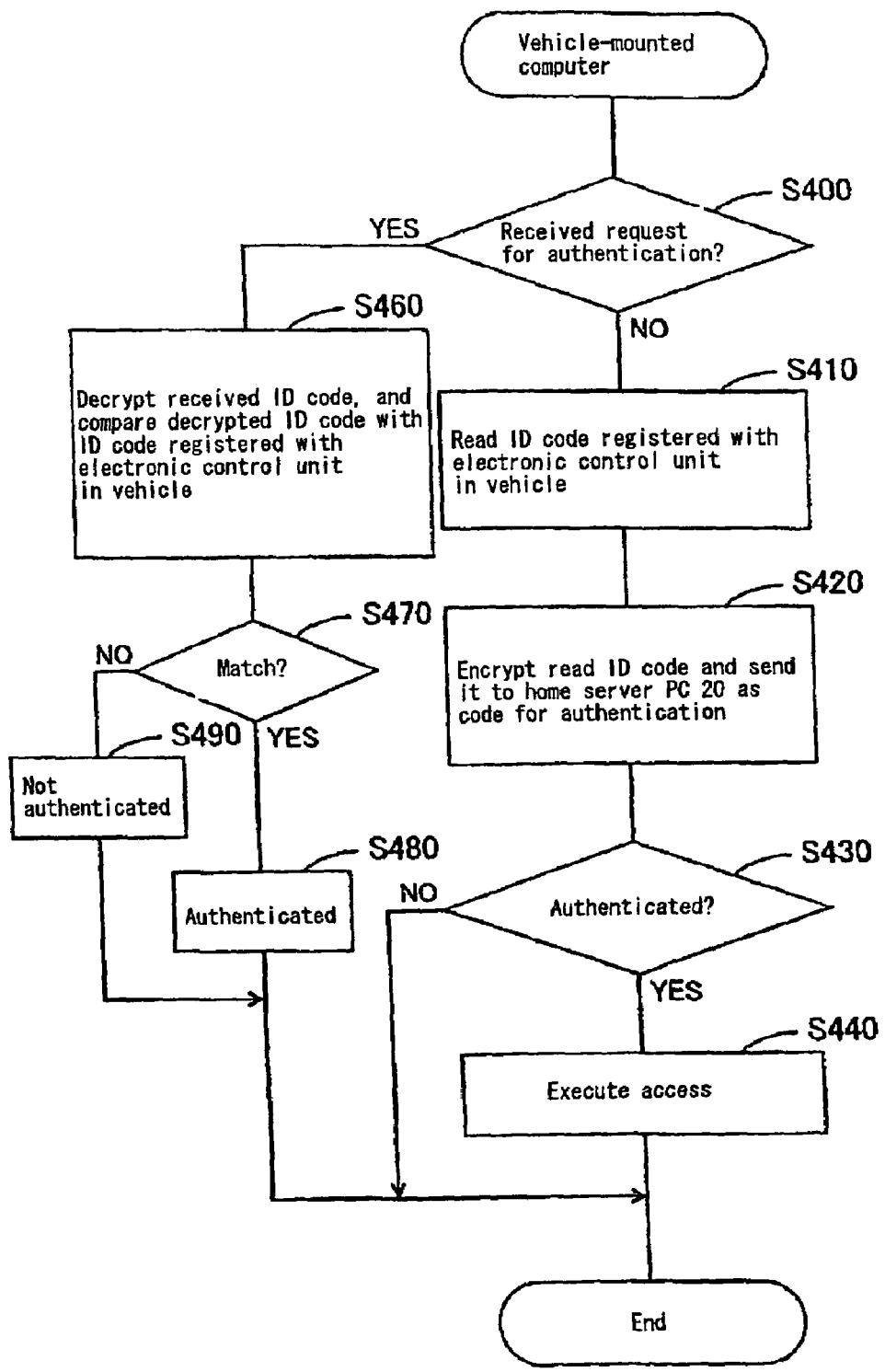
FIG. 9 is a flowchart showing a process performed by a vehicle-mounted computer.

FIG. 6 is a flowchart of the program executed by the CPU 32 of the vehicle-mounted computer 30 making remote access and the CPU 22 of the home server PC 20, and the programs are stored on the hard disks 35 and 25.

When the USB memory is plugged into the computer in step S200, the encrypted and stored data is read and is decrypted by using the public key PUB/secret key SEC. In this case, also, the vehicle-mounted computer 30 uses the public key PUB and the home server PC 20 uses the secret key SEC. The decrypted access code can be any one of a vehicle identification number VIN, a unique ID, random data RND produced by using random numbers every time the program is started, and a user's password UPW set in advance by the user, or a combination thereof. Since the access code is sent to the side which generated it and is authenticated, it is needless to judged the contents thereof.

In step S210, the decrypted access code is encrypted this time by using the computer's own public key PUB/secret key SEC. Then, in step S220, a request for remote access is outputted to a computer which is trying to access remotely through the LAN 10, and the above encrypted access code is sent out on that occasion. The request for the remote access is made by a conventional method, and the access code is sent out when the password and so on are requested. In the decryption process (step S160), the access code sent out this way is, according to the flowchart shown in FIG. 5, decrypted by the public key PUB/secret key SEC of the other party and is used for authentication (step S170). If the authentication is successful, requests for access to be made thereafter are automatically allowed.

Now, workings of the present embodiment configured as above will be described.

Let us suppose that the vehicle-mounted computer 30 is a part of the car audio system. In such a case, a user can gain access to the home server PC 20 from the vehicle-mounted computer 30 in the garage, read a music file stored in the home server PC 20, and store it on the hard disk 35. Alternatively, the user can remotely access the vehicle-mounted computer 30 in the garage, send out the music file from the home server PC 20, and stores it on the hard disk 35.

In order to send the music file from the home server PC 20, it is necessary to bring the access code of the vehicle-mounted computer 30 to the side of the home server PC 20. Therefore, when having parked the car, the user attaches the USB memory 40 to the USB interface 38 of the vehicle-mounted computer 30. Then, through the steps S100-120, the access code is encrypted by using the public key PUB in the vehicle-mounted computer 30 and is stored in the USB memory 40. With this regard, a process of generating random data RND by setting and including it in the access code is also performed.

The user removes the USB memory 40 and plugs it into the home server PC 20 at home. Then, in step S200, the encrypted access code is read from the USB memory and is decrypted by using the secret key SEC. In step S210, the access code is encrypted by the secret key SEC and, while using the encrypted access code, in step S220, a request for remote access is made.

Since the vehicle-mounted computer 30 is connected to the LAN 10 through a wireless LAN, it conducts authentication upon receipt of a request for remote access. In this regard, in step S150, an access code is requested like a password is requested, and the inputted access code is decrypted in step S160 by using the public key PUB. In step S170, it is judged whether the decrypted access code matches the stored access code for authentication.

When the authentication is conducted, by a conventional remote access method, the music file is transferred from the hard disk 25 to the hard disk 35.

Of course, it is possible to plug the USB memory 40 into the home server PC 20 before leaving home, generate the access code for the home server PC 20, store it in the USB memory 40, and take it out. Then, by plugging the USB memory 40 into the vehicle-mounted computer 30, a request for remote access is sent from the vehicle-mounted computer 30 to the home server PC 20, the music file stored on the hard disk 25 of the home server PC 20 is read remotely, and is written onto the hard disk 35 of the vehicle-mounted computer 30.

[Embodiment 2]

In the above example, the USB memory is used as a transportable storage medium for the access code. However, it serves the purpose so long as it is a transportable storage medium, and a SmartMedia card, etc. may be used. Further, the remote access may be achieved within an existing security environment, and such restriction may be added that a certain user may read but cannot write or delete data.

[Embodiment 3]

In the above example, in addition to the encryption of the access code written into the USB memory 40, the encryption is used during the transmission of the access code over the LAN 10. However the latter may be adopted as an option.

[Embodiment 4]

In the above example, the remote access is achieved between the vehicle-mounted computer 30 and the home server PC 20 by using the LAN 10. However, a router may be provided on the LAN 10 for connection to the Internet. In this way, when the vehicle-mounted computer 30 enters a hot spot in a service area of a highway, etc., the connection to the home server PC 20 through the Internet and the LAN 10 becomes possible. In this regard, if the USB memory 40 in which the access code is stored by the home server PC 20 in advance is plugged into the vehicle-mounted computer 30, the safe remote access can be achieved by using the security described above.

[Embodiment 5]

In the above examples, writable storage media such as the USB memory 40, etc. are used. However, if a vehicle in which the vehicle-mounted computer 30 is installed is an immobilizer-compatible vehicle, the following are also possible.

A key 50 of an immobilizer is provided with an electronic chip called a transponder. An ID code of the electronic chip is read by an ignition switch. Unless the ID code of the chip matches an ID code registered with an electronic control unit in the vehicle, an engine is not started electrically.

In the present embodiment, the home server PC 20 is provided with a receiving unit 60 for reading the ID code of the key 50, and the receiving unit 60 is connected with the bus 21 through a receiving unit I/F 61.

If a user has put the vehicle into a garage and returned home, and wishes to access the vehicle-mounted computer 30, first, the user places the key 50 beside the receiving unit 60, and reads the ID code of the key 50 by using a driver (not shown) of the receiving unit I/F 61 (step S310). The ID code read out is stored in a nonvolatile memory such as the hard disk 25 (step S320). Then, while encrypting the ID code by the prescribed encryption technology, the user accesses the vehicle-mounted computer 30 through the LAN 10 and wireless LAN, and sends the ID code as a code for authentication (step S330).

Upon receipt of a request for authentication (step S400), the vehicle-mounted computer 30 decrypts the ID code encrypted and sent, and compares the decrypted ID code with the ID code registered with the electronic control unit in the vehicle (step S460). When both codes are compared (step S470) and if they match with each other, the authentication is successful (step S480). If not, the authentication is not successful (step S490).

On the part of the home server PC 20, when the ID codes match with each other as described above, the authentication is completed (step S340), and the access thereafter (step S350) is made.

On the other hand, when the user gains access to the home server PC 20 at home from the vehicle-mounted computer 30 in the vehicle, as described above, a process is performed once so that the home server PC 20 can access the vehicle-mounted computer 30. Accordingly, the ID code is stored on the hard disk 25, which is a nonvolatile memory, of the home server PC 20.

On the part of the vehicle-mounted computer 30, first, the ID code registered with the electronic control unit in the vehicle is read out (step S410). While the read out ID code is being encrypted by the same encryption technology as above, access is made to the home server PC 20 through the wireless LAN and the LAN 10, and the ID code is sent as a code for authentication (step S420).

On the part of the home server PC 20, when receiving a request for authentication (step S300), the ID code encrypted and sent is decrypted, and the decrypted ID code is compared with the ID code stored on the hard disk 25 (step S360). When both are compared (step S370), and if the former matches the latter, the authentication is successful (step S380). If not, the authentication is not successful (step S390).

On the part of the vehicle-mounted computer 30, if the ID codes match with each other as above, the authentication is completed (step S430), and the access thereafter (step S440) is made.

Further, there is also an immobilizer in which the ID code is changed every time the key 50 is inserted or removed. In such a case, authentication is conducted according to the latest ID code, ensuring higher levels of security.

To sum up, it is a remote network system wherein one computer installed in a motor vehicle which adopts a security system using an immobilizer having an ID code is connected with the other computer at least by way of radio transmission.

The other computer is capable of obtaining the ID code of the immobilizer and is capable of sending the obtained ID code through the network to the above one computer to ask for authentication.

Further, when receiving the ID code and the request for authentication from the one computer through the network, it is also capable of comparing the ID code with the above ID code obtained in advance and conducting authorization.

The above one computer is capable of comparing the ID code sent from the other computer through the network with the ID code registered with the above vehicle and authenticating it, and is also capable of sending the ID code registered with the vehicle in advance through the network to the other computer and requesting authentication.

Of course, as an invention, there is no doubt that it is also achieved in individual computers making up such a remote access system.

An encrypted access code is stored in a transportable and nonvolatile memory on the part of the computer to be remotely accessed, and a user in person carries the nonvolatile memory and plugs it into the computer remotely accessing, which allows the remote access between the computer to be remotely accessed and the computer remotely accessing.

What is claimed is:

1. A remote access system, comprising:
    a pair of computers, with a first computer coupled with a second computer at least by way of radio transmission in a network;
    said first computer has an access code registered with it for remote access, is capable of accommodating a transportable and removable nonvolatile memory, encrypts said access code by a prescribed method, and stores said access code in the nonvolatile memory; and
    said second computer is capable of accommodating said nonvolatile memory, decrypts said encrypted access code when the nonvolatile memory is plugged into the second computer, and accesses said first computer by using the decrypted access code
    each of said pair of computers stores each of a first pair of key data in which data encrypted by using a first key data cannot be decrypted without using a second key data;
    the first computer encrypts said access code by using the first key data and stores it in said nonvolatile memory; and
    the second computer decrypts said access code by using the second key data;
    when remotely accessing said first computer, said second computer encrypts said access code by using said second key data and sends it out; and
    said first computer decrypts the encrypted access code by using said first key data, compares the access code stored in advance with the access code received, and conducts authentication.

2. A remote access system according to claim 1, wherein said nonvolatile memory is a SmartMedia card.

3. A remote access system according to claim 1, wherein said nonvolatile memory is a USB memory.

4. A remote access system according to claim 1, wherein said one computer is installed in a motor vehicle.

5. A remote access system according to claim 4, wherein said access code is at least based on a vehicle identification number.

6. A remote access system according to claim 1, wherein said other computer's access code is based on an individual identification number of its CPU.

7. A remote access system according to claim 1, wherein said other computer is a home server in which music data are stored.

8. A remote access system according to claim 1, wherein said pair of computers are connected with each other through a home network system.

9. A remote access system according to claim 1, wherein said pair of computers are connected with each other through the Internet.

10. A remote access system according to claim 1, wherein said access code is generated at random when said nonvolatile memory is removed and is stored in both said one computer and said nonvolatile memory.

11. A remote access method of a network system, comprising:
    coupling a pair of computers capable of accommodating a mutually transportable and removable nonvolatile memory at least by way of radio transmission;

a first computer has an access code registered with it for remote access, encrypts the access code by a prescribed method, and stores the access code in said nonvolatile memory; and a second computer decrypts said encrypted access code when the nonvolatile memory is plugged into the second computer, and makes the second computer possible to access said first computer by using the decrypted access code each of said pair of computers stores each of a first pair of key data in which data encrypted by using a first key data cannot be decrypted without using a second key data;

the first computer encrypts said access code by using the first key data and stores it in said nonvolatile memory; and the second computer decrypts said access code by using the second key data;

when remotely accessing said first computer, said second computer encrypts said access code by using said second key data and sends it out; and said first computer decrypts the encrypted access code by using said first key data, compares the access code stored in advance with the access code received, and conducts authentication.

12. A medium containing a remote access program for a network system in which a pair of computers capable of accommodating a mutually transportable and removable nonvolatile memory are connected at least by way of radio transmission, comprising:

a first computer that has an access code registered with it for remote access, and achieves a function of encrypting the access code by a prescribed method and storing the access code in said nonvolatile memory; and a second computer achieves a function of decrypting said encrypted access code when the nonvolatile memory is plugged into said second computer, and accessing said first computer by using the decrypted access code each of said pair of computers stores each of a first pair of key data in which data encrypted by using a first key data cannot be decrypted without using a second key data;

the first computer encrypts said access code by using the first key data and stores it in said nonvolatile memory; and the second computer decrypts said access code by using the second key data;

when remotely accessing said first computer, said second computer encrypts said access code by using said second key data and sends it out; and said first computer decrypts the encrypted access code by using said first key data, compares the access code stored in advance with the access code received, and conducts authentication.

* * * * *